(12) United States Patent
Schuettel et al.

(10) Patent No.: US 6,776,061 B2
(45) Date of Patent: Aug. 17, 2004

(54) SHOCK-ABSORBING SCREW MODULE

(75) Inventors: Patrick Schuettel, Roches (CH); Kurt Dreier, Vicques (CH)

(73) Assignee: Tornos SA, Moutier (CH)

( * ) Notice: Subject to any disclaimer, the term of this patent is extended or adjusted under 35 U.S.C. 154(b) by 41 days.

(21) Appl. No.: 10/128,491

(22) Filed: Apr. 24, 2002

(65) Prior Publication Data

US 2002/0178848 A1 Dec. 5, 2002

(30) Foreign Application Priority Data

Apr. 25, 2001  (EP) .............................................. 01810409

(51) Int. Cl.$^7$ ............................................. F16H 25/08
(52) U.S. Cl. ................................... 74/89.36; 74/89.23
(58) Field of Search ............................ 74/89.36, 89.23, 74/89.37, 89.32, 89.33, 89.34, 411, 425, 406

(56) References Cited

U.S. PATENT DOCUMENTS

| | | | | |
|---|---|---|---|---|
| 2,011,486 A | | 8/1935 | Kingsbury ...................... 29/50 |
| 3,733,940 A | * | 5/1973 | Harman et al. ................ 82/132 |
| 4,442,725 A | * | 4/1984 | Urabe ........................ 74/89.36 |
| 4,509,382 A | * | 4/1985 | Colautti et al. ............. 74/89.42 |
| 4,827,787 A | | 5/1989 | Gillingham et al. ......... 74/411.5 |
| 5,349,731 A | * | 9/1994 | Sheehan et al. ............. 29/27 R |
| 5,605,071 A | * | 2/1997 | Buchanan, Jr. ............... 74/425 |
| 5,760,357 A | * | 6/1998 | Nakamura et al. ......... 200/33 B |
| 6,026,696 A | * | 2/2000 | Hehl ....................... 74/424.92 |

FOREIGN PATENT DOCUMENTS

| | | |
|---|---|---|
| JP | A 1-92054 | 4/1989 |
| JP | 10202461 | 8/1998 |

* cited by examiner

*Primary Examiner*—David A. Gucci
*Assistant Examiner*—Julie K. Smith
(74) *Attorney, Agent, or Firm*—Oliff & Berridge, PLC

(57) ABSTRACT

An apparatus for guiding a threaded spindle in rotation, which spindle is used to ensure the displacement in translation of a mobile element connected to a threaded female piece engaged on this threaded spindle, which threaded spindle has a certain length and is connected, by one of its opposite ends, to a motor device for driving in rotation about its longitudinal axis in such a way as to allow the displacement in translation of the threaded female piece, wherein this apparatus includes at least one device for elastic absorption of an axial force which force, directed axially with respect to the threaded spindle and toward either one of its opposite ends, arises between this threaded spindle and the threaded female piece, and which force, when exceeding a certain limit, is considered likely to distort in particular the surfaces by which the threaded spindle and the threaded female piece cooperate.

5 Claims, 1 Drawing Sheet

# SHOCK-ABSORBING SCREW MODULE

BACKGROUND OF THE INVENTION

This invention relates to an apparatus for guiding a threaded spindle in rotation, which spindle is used to ensure the translatory displacement of a mobile element connected to a threaded female piece engaged on this threaded spindle.

BRIEF SUMMARY OF THE INVENTION

More specifically, the invention relates to an apparatus for guiding a threaded spindle in rotation, which spindle is used to ensure the translatory displacement of a mobile element connected to a threaded female piece engaged on this threaded spindle, which threaded spindle has a certain length and is connected, by one of its opposite ends, to a motor device for driving in rotation about its longitudinal axis in such a way as to allow the translatory displacement of the threaded female piece.

The invention applies more particularly, but not exclusively, to an apparatus for guiding in rotation a threaded spindle used to ensure, through a mechanical connection with the threaded female piece which it engages, the translatory displacement of a tool carriage on a machine tool, for example a lathe.

Especially on such machines, the carriage can be accidentally caused to collide with an obstacle, such as another carriage or slide, for example as a result of a wrong maneuver.

When it arises, such a blockage imposes particularly great mechanical stresses especially upon the threaded female piece connected to the carriage and upon the threaded spindle which controls the displacement of the said threaded female piece.

Known in order to limit the effects of such mechanical stresses is equipping the motor device for driving the threaded spindle in rotation about its longitudinal axis with a device for detection of an overload and of interruption in operation of the motor device if an overload is detected.

These devices have their advantages, but they effectively allow the stopping of the motor device; this is indisputable after great mechanical stresses have occurred, in particular between the threaded spindle and the threaded female piece.

One result which the invention aims to obtain is an apparatus for guiding in rotation a threaded spindle used to ensure the translatory displacement of a mobile element connected to a threaded female piece engaged on this threaded spindle which apparatus makes it possible to limit drastically the value of such mechanical stresses.

A number of machine tools make use of a plurality of assemblies each made up of a threaded spindle and a threaded female piece and more specifically constructions known by the name of ball screws.

These constructions are especially sensitive to axial stresses arising during the aforementioned blockages, i.e. these stresses can affect in particular their functioning to the point where they have to be replaced after having been stressed too much.

The invention has as its object a guiding apparatus of the aforementioned type, characterized in particular in that it comprises at least one device for elastic absorption of a force which, oriented axially with respect to the threaded spindle and toward either one of its opposite ends, arises between this threaded spindle and the threaded female piece and the value of which is considered likely to distort in particular the surfaces along which the threaded spindle and the threaded female piece cooperate.

The invention will be better understood from reading the description which follows, given by way of non-limiting example, with reference to the attached drawing which schematically represents an apparatus for guiding a threaded spindle in rotation, according to the invention, seen in a section along a longitudinal plane.

DETAILED DESCRIPTION OF PREFERRED EMBODIMENTS

Figure 1:
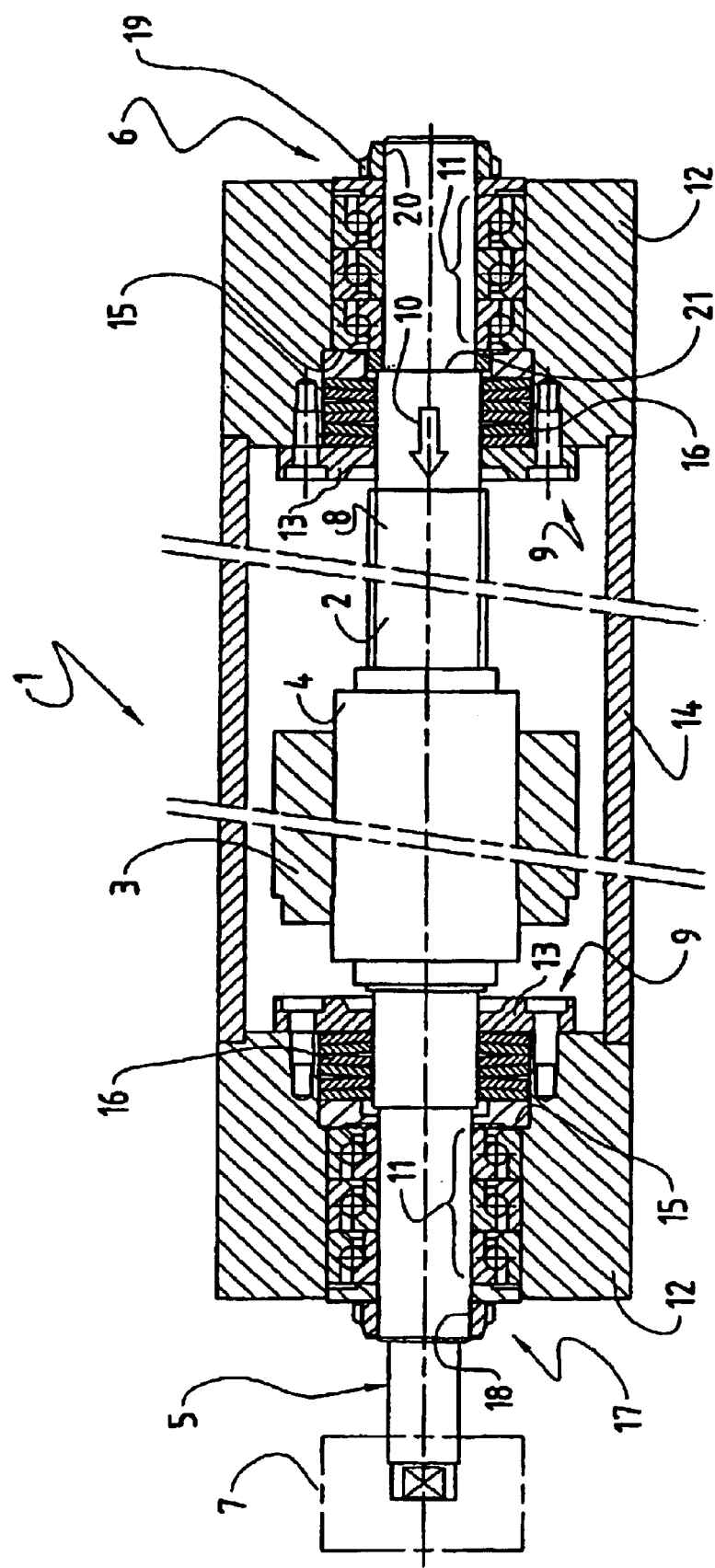
FIG. 1 is a cross-sectional view of an apparatus according to one embodiment of the invention.

Referring to the drawing, an apparatus 1 can be seen for guiding in rotation a threaded spindle 2 used to ensure the translatory displacement of a mobile element 3 connected to a threaded female piece 4 engaged on this threaded spindle 2, which threaded spindle 2 has a certain length and is connected, by one 5 of its opposite ends 5, 6, to a motor device 7 for driving in rotation about its longitudinal axis 8 in such a way as to allow the translatory displacement of the threaded female piece 4.

In a noteworthy way, the apparatus 1 comprises at least one device 9 for elastic absorption of a force 10 which, oriented axially with respect to the threaded spindle 2 and toward either one of its opposite ends 6, 5, arises between this threaded spindle 2 and the threaded female piece 4 and the value of which is considered likely to distort in particular surfaces along which the threaded spindle 2 and the threaded female piece 4 cooperate.

When combined with use of a device for detection of an overload and of a shutting off of the motor device if an overload is detected, the presence in the rotation guiding apparatus of a device 9 for elastic absorption of an axial force 10 makes it possible to dramatically reduce the risk of distortion of the threaded spindle and of the threaded female piece.

One skilled in the art will be able to assess the value of the axial force likely to affect the threaded spindle and/or the threaded female piece.

In particular, the makers of ball screws, i.e. of threaded spindle and threaded female piece assemblies in which the threaded female piece uses a plurality of balls circulating in a closed path, are able to indicate the value of the maximal axial force which the threaded spindle and the threaded female piece can sustain without damage likely to impede their functioning.

The guiding apparatus 1 is preferably of the type comprising:
 two elements 11 for guiding the threaded spindle 2 in rotation about its longitudinal axis 8, these elements 11 each being situated at the level of one end 5, 6 of the threaded spindle 2,
 two housings 12, each accommodating one of the elements 11 for guiding in rotation, and at least one of these housings bearing at least one stop 13, said first stop, for stopping in translation an element 11 for guiding in rotation the threaded spindle 2 along the longitudinal axis 8 of the threaded spindle 2,
 a structure 14 inserted between the housings 12 in such a way as to maintain a predetermined spacing between these housings 12.

One skilled in the art will be able to select the guiding elements 11. In the example shown, each guiding element comprises a plurality of angular contact ball bearings, but bearings of other types can be involved.

In this case, the apparatus 1 according to the invention is noteworthy in that the two elements 11 for guiding in rotation are each guided in translation in the housing 12 which accommodates them, at least one of the two elements 11 for guiding in rotation is immobilized in translation on the end 5, 6 of the threaded spindle 2 at the level at which it is disposed, is of a type able to transmit to at least one stop 13, said first stop, borne by its housing 12 at least one force 10 which, referred to as axial, is applied by the threaded spindle 2 and which is, on the one hand, directed parallel to the longitudinal axis 8 of this threaded spindle 2, and, on the other hand, directed toward one of the ends 5, 6 of the said threaded spindle 2, has at least one surface 15, referred to as transmission surface 15, which is oriented to transmit the axial force 10 to the said stop 13 of the housing 12, the absorption device 9 is, on the one hand, inserted between the first stop 13 intended to receive the axial force 10 and the transmission surface 15, and, on the other hand, comprises at least one element 16 elastically compressible under the effect of the axial force 10.

One skilled in the art is able to select the most appropriate elastic element to make up each element 16 elastically compressible under the effect of an axial force 10.

The apparatus 1 according to the invention is noteworthy in that one end 6, referred to as the second end, of two opposite ends 5, 6 of the threaded spindle is locked in translation with respect to the element 11 for guiding in rotation which it bears, and this between opposite stops 19, 21, referred to as second and third stops, provided on the threaded spindle 2, rests on the first stop 13 intended to receive the axial force 10 by means of the absorption device 9 situated on said second end 6, a structure 14 inserted between the housings 12 in such a way as to maintain a predetermined spacing between these housings 12, the other end 5 of the threaded spindle 2, referred to as the first end, is immobilized in translation in a way adjustable with respect to the element 11 for guiding in rotation which it bears, and this, on the one hand, between an adjustable stop 17, referred to as the fourth stop, provided on the threaded spindle 2, and, on the other hand, the absorption device 9 situated on said first end 5.

One stop 19, referred to as the second stop of the stops 19, 21, referred to as the second and third stops, provided on the threaded spindle 2 to immobilize the said second end 6 relative to the element 11 for guiding in rotation which it bears is made up of a locking nut 19 whereas the other stop 21, said third stop, for its part, is made up of a collar 21.

In this case, the apparatus 1 according to the invention is likewise noteworthy in that:

it comprises elements 17 to 20 for tensioning the threaded spindle 2 between the two absorption devices 9, i.e. elements 17 to 20 which, by pressing at the level of the said absorption devices 9, allow a prestressing of predetermined traction to be applied to the threaded spindle 2, each element 16, elastically compressible under the effect of an axial force 10, with which an absorption device 9 is provided, has a resistance to elastic deformation which is selected such that the traction prestressing is able to be applied to the threaded spindle 2 without influencing the functioning of the absorption devices 9.

The application of a prestressing through traction to a spindle makes it possible to overcome drawbacks that can result from the elongation of this spindle through thermal expansion.

In a preferred embodiment of the invention, the elements 17 to 20 for tensioning of the threaded spindle 2 between the two absorption devices 9 comprise:

at least a first threaded bearing surface 18 provided on the said first end 5 of the said first and second opposite ends 5, 6 of the threaded spindle 2 and at least a first threaded element 17 which, engaged on this first threaded bearing surface 18, moreover rests on the absorption device 9 situated at this said first end 5, at least one stop 19, 20, of the stops referred to as the second stop 19 and the fifth stop 20, which, situated at the said second end 6 of the said first and second opposite ends 5, 6 of the threaded spindle 2, presses on the absorption device 9 situated at this second end 6.

The indication that the first threaded element 17, with which a first end of the threaded spindle 2 is equipped, presses moreover on the absorption device 9 situated at this first end 5 must be understood in its broadest senses, i.e. that the pressing is achieved directly or indirectly.

The indication that at least one stop 19, 20 of said second and fifth stops, situated at the second end 6 of the opposite ends 5, 6 of the threaded spindle 2, presses on the absorption device 9 situated at this second end 6 must likewise be understood in its broadest sense, i.e. that the pressing is achieved directly or indirectly.

In one embodiment, each of the ends 5, 6 of the threaded spindle has a threaded bearing surface on which a threaded element 17, 19 is engaged. Preferably, for tensioning the threaded spindle, one proceeds only from one of its ends only.

In another noteworthy embodiment of the invention:

the two elements 11 for guiding in rotation are each immobilized in translation on one of said first and second ends 5, 6 of the threaded spindle 2, one of the housings 12 bears two first stops 13:

a first being oriented to receive an axial force 10 directed parallel to the longitudinal axis 8 of the threaded spindle 2 and directed toward said first 5 of said first and second opposite ends 5, 6 of said threaded spindle 2, a second being oriented to receive an axial force 10 directed parallel to the longitudinal axis 8 of the threaded spindle 2 and directed toward said second 6 of said first and second opposite ends 5, 6 of said threaded spindle 2, one of these elements 11 is of a type able to transmit each of the two axial forces 10 to that of the two first stops 13 borne by its housing 12 which is oriented to receive it, has two surfaces, referred to as transmission surfaces 15, which are each oriented to transmit to one of the two first stops 13 of the housing 12 the axial force received from the threaded spindle 2, the housing 12, which bears the two first stops 13, contains two absorption devices 9, each absorption device 9 comprising at least one element elastically compressible under the effect of the axial force 10.

What is claimed is:

1. An apparatus for guiding a threaded spindle in rotation, wherein the spindle is utilized for the displacement in translation of a mobile element coupled to a threaded female piece engaged on the threaded spindle, which threaded spindle has a length and is coupled, by one of its opposite first and second ends, to a motor device for driving the threaded spindle in rotation about a longitudinal axis of the threaded spindle in such a way as to allow the displacement in translation of the threaded female piece, wherein the apparatus comprises;

a first absorption device for elastic absorption of an axial force, which force, directed axially with respect to the threaded spindle and toward at least one of the first and second opposite ends, arises between the threaded spindle and the threaded female piece;

first and second guiding elements for guiding the threaded spindle in rotation about the longitudinal axis, the first and second guiding elements disposed at opposite ends of the first and second ends of the threaded spindle;

first and second housings, wherein each housing includes one of the first and second guiding elements, and at least one of the first and second housings has a first stop, for stopping in translation at least one of the first and second guiding elements along the longitudinal axis of the threaded spindle; and a structure inserted between the first and second housings to provide a predetermined spacing between the first and second housings, wherein the first and second guiding elements are each guided in translation in the first and second housings, at least one of the first and second guiding elements being prevented from translational movement on at least one of the first and second ends of the threaded spindle, at least one of the first and second guiding elements transmits to the first stop at least one axial force which is applied by the threaded spindle and the at least one axial force is directed to at least one of a direction parallel to the longitudinal axis of the threaded spindle and a direction toward one of the first and second ends of the threaded spindle, at least one of the first and second guiding elements has at least one transmission surface, the transmission surface being oriented to transmit the axial force to the first stop of at least one of the first and second housings, wherein the first absorption device is inserted between the first stop, which receives the axial force, and the transmission surface, the first absorption device including at least one elastic element elastically compressible under the effect of the axial force, wherein the second end is locked in translation with respect to the second guiding element by a second and a third stop provided on the threaded spindle, the second end being disposed on the first stop, the second end receives the axial force via the second absorption device disposed on the second end, and wherein the first end is prevented from translational movement with respect to the first guiding element by a fourth stop, provided on the threaded spindle, and the first absorption device is disposed on the first end.

2. The apparatus according to claim 1, further comprising first and second tensioning elements for tensioning the threaded spindle between the first absorption device and a second absorption device, the first and second tensioning elements allowing a prestressing of predetermined traction to be applied to the threaded spindle, each of the first and second tensioning elements having a resistance to elastic deformation such that the prestressing of predetermined traction is able to be applied to the threaded spindle without influencing the functioning of the first and second absorption devices.

3. The apparatus according to claim 2, wherein the first and second tensioning elements for tensioning the threaded spindle between the first and second absorption devices comprising: at least a first threaded bearing surface provided on the first end of the threaded spindle and at least a first threaded element which, engaged on the first threaded bearing surface, is disposed on the first or second absorption device that is disposed on the first end, and at least one of the second stop and a fifth stop is disposed at the second end of the threaded spindle, wherein at least one of the second stop and the fifth stop presses on at least one of the first and second absorption devices that is disposed at the second end.

4. The apparatus according to claim 1, wherein the first and second guiding elements are prevented from translational movement on one of the first and second ends of the threaded spindle, one of the first and second housings has at least a primary first stop and a secondary first stop, wherein the primary first stop is oriented to receive a first end axial force directed parallel to the longitudinal axis of the threaded spindle and directed toward the first end of the threaded spindle, the secondary first stop being oriented to receive the second end axial force directed parallel to the longitudinal axis of the threaded spindle and directed toward the second end of the threaded spindle, wherein one of the first and second guiding elements transmits each of the first and second end axial forces to one of the primary and secondary first stops, one of the first and secondary guiding elements having at least two transmission surfaces, the at least two transmission surfaces being each oriented to transmit at least one of the first and second end axial forces received from the threaded spindle to one of the primary and secondary first stops, at least one of the first and second housings, which has both the primary and secondary first stops, having a primary and a secondary absorption device, each of the primary and second absorption devices comprising at least one elastic element elastically compressible under at least one of the first and second end axial forces.

5. The apparatus according to claim 1, wherein when the axial force exceeds a limit, the axial force distorts surfaces by which the threaded spindle and the threaded female piece cooperate.

* * * * *